Dec. 9, 1947.　　　　　　E. W. DAVIS　　　　　2,432,290
COMBINATION FLUSHER AND AIR FILTER CLEANER
Filed Aug. 20, 1942
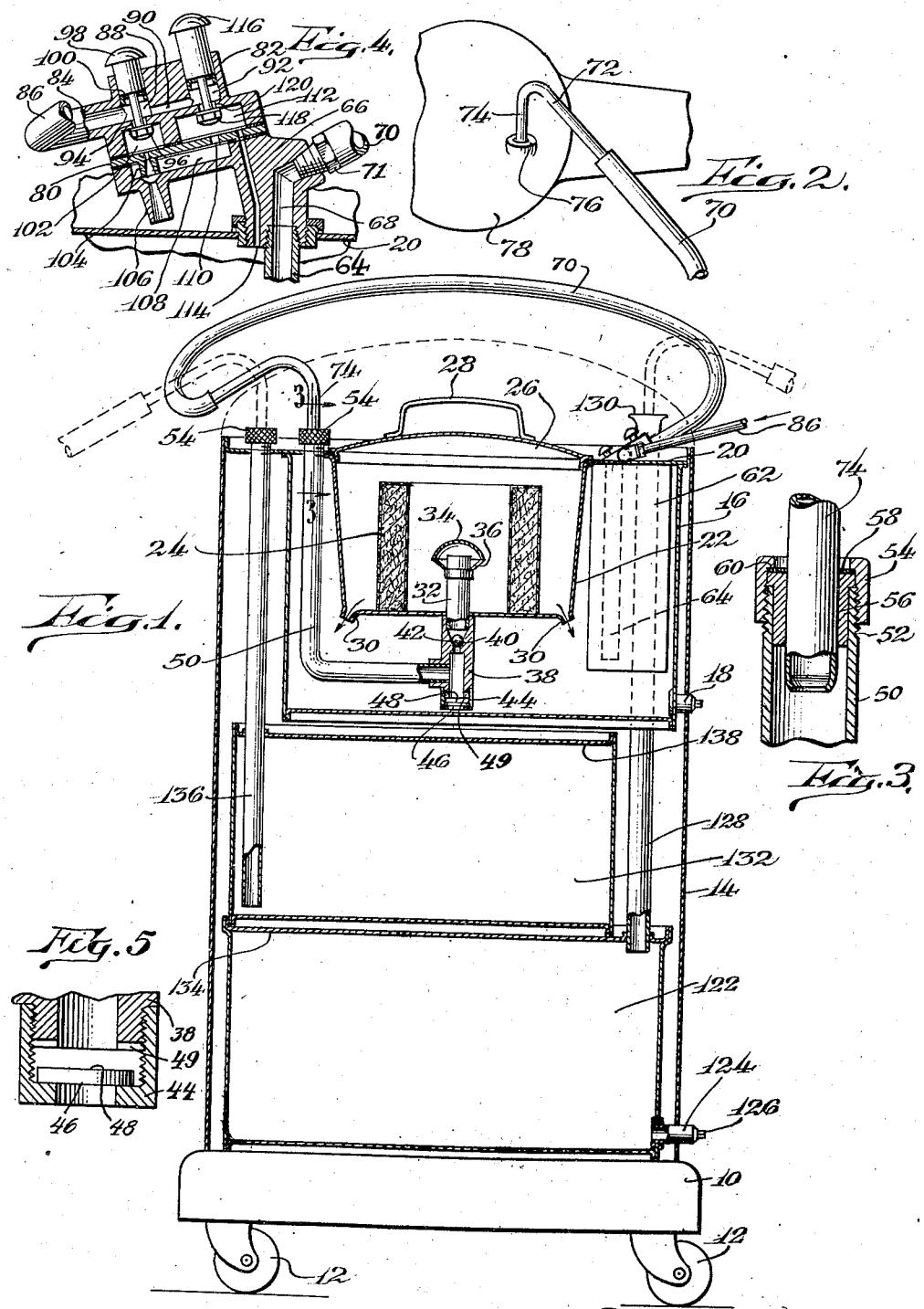
Inventor:
Ernest W. Davis
By Williams, Bradbury & Hinkle
Attorneys Patented Dec. 9, 1947

2,432,290

UNITED STATES PATENT OFFICE 2,432,290

COMBINATION FLUSHER AND AIR FILTER CLEANER

Ernest W. Davis, River Forest, Ill., assignor to Stewart-Warner Corporation, Chicago, Ill., a corporation of Virginia Application August 20, 1942, Serial No. 455,521

3 Claims. (Cl. 134—167)

1

My invention relates to combination flusher and air filter cleaners, and is more particularly concerned with an apparatus specially designed, and intended for flushing the differentials and transmissions of automobiles, and for cleaning the cartridges provided in the air filters for the engine carburetors.

An object of my invention is to provide a combination flusher and air filter cleaner which is of a type adapted for use in garages and service stations, and which may readily be used in connection with the facilities normally provided in such places.

Another object of my invention is to provide a new and improved combination flusher and air filter cleaner, which may readily be moved from place to place.

Another object is to provide a new and improved combination flusher and air filter cleaner, which is relatively inexpensive to manufacture, and which will stand rough usage and abuse without injury, and without requiring any particular attention.

Another object of my invention is to provide a new and improved combination flusher and air filter cleaner, which has a minimum of moving parts.

Another object of my invention is to provide a new and improved combination flusher and air filter cleaner, which provides receptacles for the cleaning fluid and for the waste removed from the transmissions and differentials.

Another object is to provide a combination flusher and air filter cleaner which can be used to remove different kinds of lubricants from automobile transmissions and differentials, and other housings.

Other objects and advantages will become apparent as the description proceeds.

In the drawings,

Fig. 1 is a vertical sectional view of a preferred embodiment of my invention;

Fig. 2 is a view showing the manner in which my invention is utilized in flushing the differential casing of an automobile;

Fig. 3 is a sectional view of a detail, and is taken on the line 3—3 of Fig. 1;

Fig. 4 is a sectional view of the valve mechanism for creating suction and pressure; and Figure 5 is an enlarged sectional view of the disc valve shown in Figure 1.

In Fig. 1, I have illustrated a preferred embodiment of my invention as having a base 10 which is mounted on casters 12 to facilitate movement of the combination flusher and air

2 filter cleaner from place to place about a garage or service station. The base 10 may be stamped from sheet metal, or otherwise formed in any suitable manner, and acts as a support for a cylindrical cover 14 which rests upon the upper surface of the base 10 and forms a support for an upper tank 16 which is welded, or otherwise suitably secured to the upper end of the cover 14.

The tank 16 has a removable drain plug 18 which extends through the cover 14 and may be removed at relatively long intervals for the purpose of cleaning the tank 16. The upper end of the tank 16 is closed by a top 20 which may be formed as a sheet metal stamping, and which supports a container 22 of smaller size than, and located within, the tank 16. The container 22 is adapted to hold an air filter cartridge such as is indicated at 24, and a removable cover 26 having a handle 28 is provided for the container 22.

The container 22 has drain openings 30 which permit the liquid in the container 22 to drain into the tank 16. An inlet pipe 32 is provided for the container 22, and has a sheet metal head 34 removably supported on the upper end of this pipe. The head 34 has downwardly directed openings 36 whereby the liquid entering the inlet pipe 32 may flow into the interior of the container 22 and into the cylindrical opening in any filter cartridge which may be placed therein.

The lower end of inlet pipe 32 is connected to a T fitting 38 having a valve seat 40 adapted to be closed by a ball valve 42 which is urged by gravity against the seat 40. A sleeve 44 is attached to the lower end of the T 38 and has an in-turned flange 46 forming a seat for a disc valve 48 which is urged by gravity against its seat 46. The lower end of the fitting 38 is slotted as indicated at 49 so that the disc valve 48 will not seal thereagainst.

A pipe 50 has its lower end connected to the T fitting 38 between the valve seats 40 and 46. The upper end of the pipe 50 extends through a suitable opening in the top 20 and is threaded as indicated at 52, see Fig. 3, to receive a tubular nut 54. A hat shaped sealing member 56, whose upper end is clamped between the end of pipe 50 and a metal washer 58 abutting against shoulder 60 provided by the nut 54, serves as a means for forming a sealed connection between the pipe and a nozzle which I shall presently describe.

A flusher tank 62 is suspended from the top 20 and is located in the tank 16 at one side of the container 22. A pipe 64 extends downwardly into the flusher tank 62 to a point just above the bottom of this tank. This pipe 64 has its upper end threaded into a casting 66, see Fig. 4, attached to the cover 20. A duct 68 in the casting 66 communicates with the upper end of pipe 64 and with a hose or other flexible conduit 70 whose end 71 is screwed into the casting 66, as shown in Fig. 4. The other end of the hose 70 is provided with a nozzle 72 having a laterally directed end 74 adapted to be inserted in the filling opening 76 of a differential housing 78, as indicated in Fig. 2. The end 74 of the nozzle 72 is also adapted to be inserted in the upper end of the pipe 50, as shown in Fig. 3, and when so inserted, this nozzle forms a sealed connection with the sealing means 56 in the upper end of the pipe 50.

The casting 66 forms a part of a valve mechanism for creating either suction or pressure in the flusher tank 62. This valve mechanism includes a plate 80 clamped between the casting 66 and a valve body 82 having an inlet 84 adapted to be connected by a flexible hose 86 with the air pressure tank, which is a standard part of the equipment of every service station and garage, and which provides the air for inflating tires and for other purposes.

The valve body 82 has a valve chamber 88 which is in communication with the inlet 84 and with a duct 90 leading to a second valve chamber 92, so that both of these valve chambers are at all times in communication with the air in the pressure tank. Valve chamber 88 has an outlet port 94 controlled by a valve 96 connected with a control button 98 adapted for manual actuation. A cup washer 100 forms a seal between the button 98 and the valve body 82, and since the diameter of this washer is greater than the diameter of the port 94, the air pressure serves to hold the valve 96 in closed position.

When button 98 is moved inwardly to open valve 96, air passes from valve chamber 88 into outlet chamber 102, and thence through concentric nozzles 104 and 106 to atmosphere. These nozzles are arranged to produce the effect of a Venturi tube and the escape of air through the nozzles 104 and 106 creates suction in a suction chamber 108, which communicates with the Venturi-like throat between the nozzles. The head of the button 98 contacts the upper surface of the valve body 82 before the valve 96 can close the passage through nozzle 104. The suction in the chamber 108 is communicated through port 110, chamber 112, and duct 114 to the flusher tank 62.

When it is desired to create pressure in the flusher tank 62, button 116 is depressed to move valve 118 away from port 120 and to move this valve to a position where it closes port 110. Air under pressure can then flow from inlet 84 through valve chamber 88, duct 90, valve chamber 92, port 120, chamber 112, and duct 114 into the upper end of the flusher tank 62. By manipulating the buttons 98 and 116, either pressure or suction may be created in the flusher tank 62.

A waste tank 122 is supported directly on the base 10 and has a drain 124 normally closed by a removable plug 126 for cleaning of the waste tank 122 at relatively long intervals. A down spout 128 empties into the top of the waste tank 122, and has a flaring mouth 130 located above the top 20 through which the pipe 128 passes. The flaring mouth 130 is adapted to receive the end 74 of nozzle 72 as indicated by dotted lines in Fig. 1.

A cleaning fluid tank 132 is supported on the top 134 of waste tank 122. The tank 132 has an outlet pipe 136 which extends from a point immediately above the bottom of this tank to a point above the top 20. The upper end of the pipe 136 is provided with a nut 54 and with sealing means identical with that connected to the top of pipe 50. The upper end of cleaning fluid tank 132 is closed by a cover 138.

When it is desired to use my combined flusher and air filter cleaner to flush old lubricant from a differential housing, the nozzle end 74 is inserted in the filler opening of the differential housing, as indicated in Fig. 2. The operator then depresses button 98 to create a suction in flusher tank 62, whereupon the old lubricant in the differential housing is sucked into this flusher tank. The noise resulting from the flow of the old lubricant into the flusher tank is readily audible, and when this noise ceases, the operator can tell that the differential housing has been emptied of lubricant. If desired, the adjacent walls of flusher tank 62, tank 16, and cover 14, could be provided with windows which would indicate at all times the quantity of liquid in the flusher tank.

After all lubricant has been withdrawn from the differential housing 78, the operator releases button 98 and withdraws the end 74 of nozzle 72 from this housing and inserts the end 74 of this nozzle in the mouth 130 of down spout 128, as indicated in dotted lines in Fig. 1. The operator then depresses pressure button 116, which admits air under pressure to the flusher tank and forces the old lubricant upwardly through pipe 64, hose 70, and nozzle 72, into down spout 128. This old lubricant flows downwardly in this down spout and into the waste tank 122, which serves as a collection receptacle for quantities of old lubricant withdrawn from differential housings, transmission housings, and similar containers. When all of the old lubricant has been discharged from the flusher tank 62 into waste tank 122, the operator releases pressure button 116 which returns to the off position.

The operator then withdraws end 74 of nozzle 72 from the mouth of down spout 128 and inserts this nozzle in the upper end of pipe 136. Since the upper end of this pipe is provided with sealing means like that shown in Fig. 3, a sealed connection is formed between the upper end of this pipe and end 74 of nozzle 72. The operator then depresses the suction button 98, which creates a suction in flusher tank 62 and draws thereinto cleaning fluid from the tank 132. When desired quantities of cleaning fluid have been admitted to flusher tank 62, the operator releases the suction button 98 and withdraws the end 74 of nozzle 72 from the upper end of pipe 136.

The operator next inserts the end 74 of nozzle 72 in the filler opening 76 of the differential housing 78. He then depresses the pressure button 116 which forces the cleaning fluid from the flusher tank 62 into the housing 78. By alternately depressing and releasing the suction and pressure buttons 98 and 116, respectively, the operator can cause the cleaning fluid to switch back and forth between the flusher tank 62 and the differential housing 78 and thoroughly clean this housing and the gearing located therein. As soon as this has been accomplished and all of the cleaning fluid has been returned to the flusher tank 62, the operator withdraws the end 74 of nozzle 72 from the filler opening 76 and inserts it in the flaring mouth 130 of the down spout 128. The used cleaning fluid is then forced into the waste tank 122 by depressing the pressure button 116 to create pressure in the flusher tank 62. The cleaning or flushing of the differential housing is now complete, and fresh lubricant can be supplied thereto from any suitable lubricant compressor or other source of lubricant supply.

When it is desired to use my combination flusher and air filter cleaner to clean the cartridge of an air filter, the cartridge is located in the container 22 as indicated by reference numeral 24, and cover 26 is placed over the container 22 as shown in Fig. 1. The end 74 of nozzle 72 is inserted in the upper end of pipe 136 and cleaning fluid is drawn from tank 132 into flusher tank 62 by pressing down on suction button 98 until the desired quantity of cleaning fluid is in the flusher tank 62. The end 74 of nozzle 72 is then withdrawn from the upper end of pipe 136 and inserted in the upper end of pipe 50.

The operator then depresses button 116 to admit air pressure to the flusher tank 62 and to force the cleaning fluid therein through hose 70 and nozzle 72 into pipe 50. The cleaning fluid flowing into pipe 50 raises ball valve 42 and flows into the center of the cartridge 24 by way of inlet pipe 32 and openings 36 in head 34. The cleaning fluid thus flowing into the center of the hollow cartridge 24 flows outwardly through the walls of this cartridge and removes the dirt and other impurities therefrom. The contaminated cleaning fluid then flows into tank 16 through drain openings 30. Disc valve 48 remains closed while fluid is being supplied to the container 22.

After all of the fluid in flusher tank 62 has been passed through the cartridge 24, the pressure button is released and the suction button is depressed. This creates a suction in flusher tank 62 and the cleaning fluid in tank 16 is drawn upwardly past disc valve 48 through pipe 50, nozzle 72, and hose 70, to flusher tank 62. By alternately depressing the pressure and suction buttons, the cleaning fluid can be passed through the cartridge 24 any desired number of times. After the cartridge has been thoroughly cleaned, the end 74 of nozzle 72 is withdrawn from pipe 50 and inserted in down spout 128, and the dirty cleaning fluid discharged into waste tank 122.

An important feature of my invention lies in the provision of means for performing all of the necessary functions through the use of compressed air supplied from the usual air pressure tank which forms part of the equipment of every garage and service station. This makes it unnecessary to provide any motor mechanism or mechanical pump for circulating the fluids, and thereby greatly reduces the cost of manufacture. The elimination of such motor mechanism and mechanical pumping means also eliminates service difficulties, and produces an apparatus having a minimum of moving parts, and these few moving parts are of extremely simple and rugged construction.

While I have illustrated only a single embodiment of my invention, it is to be understood that my invention is susceptible of numerous variations and modifications, and that the scope of my invention is defined by the following claims.

I claim:

1. In a combined flusher and air filter cleaner of the class described, the combination of a base, a first tank supported directly on said base, a second tank supported on said first tank, a cover supported on said base, a third tank supported by said cover, a flusher tank mounted in said third tank, an air cleaner container mounted in said third tank, means for creating suction or pressure in said flusher tank, and a single conduit means for connecting said flusher tank with said container and with said other three tanks, the parts being constructed and arranged so that the flusher tank communicates selectively through the single liquid conduit with the air cleaner container and with said other three tanks to draw liquid from each of the same or fill each with liquid.

2. In apparatus of the class described, the combination of a first tank, a container located in said tank and having drain openings communicating therewith, a T connection in said tank and below said container, a conduit connecting said T connection with the interior of said container, valve means controlling flow through said conduit, valve means connecting said T with said tank at a point adjacent the bottom thereof, a pipe connected to said T, a flusher tank, a hose for selectively connecting said flusher tank with said pipe or with a source of cleaning fluid, and means for alternately connecting said flusher tank with pressure or suction producing means.

3. A combination flusher and air filter cleaner comprising a cleaning fluid tank, a waste tank, a cartridge container, a cartridge cleaning tank in which said container is located, a flusher tank, a single liquid conduit for said flusher tank, conduit means leading to said cleaning fluid tank, conduit means leading to said cartridge container and said cartridge cleaning tank, conduit means leading to said waste tank, means associated with said single liquid conduit adapted to establish communication between any one of said conduit means or a lubricant housing to be flushed and said single liquid conduit, and means for creating suction or fluid pressure in said flusher tank for drawing material thereinto or discharging material therefrom through said single conduit, the parts being constructed and arranged so that the flusher tank communicates selectively through the single liquid conduit with the cleaning fluid tank, waste tank, cartridge cleaning tank and said lubricant housing to draw liquid from each of these or fill the same with liquid.

ERNEST W. DAVIS.

REFERENCES CITED

The following references are of record in the file of this patent:

UNITED STATES PATENTS

| Number | Name | Date |
| --- | --- | --- |
| 1,955,169 | Bertschinger | Apr. 17, 1934 |
| 2,020,350 | Bertschinger | Nov. 12, 1935 |
| 2,174,311 | Born | Sept. 26, 1939 |
| 1,666,992 | Collier | Apr. 24, 1928 |
| 2,223,553 | Davis | Dec. 3, 1940 |
| 2,295,539 | Beach | Sept. 15, 1942 |